United States Patent [19]

Khowles

[11] Patent Number: 4,958,894
[45] Date of Patent: Sep. 25, 1990

[54] BOUNCING OSCILLATING SCANNING DEVICE FOR LASER SCANNING APPARATUS

[75] Inventor: Carl H. Khowles, Moorestown, N.J.

[73] Assignee: Metrologic Instruments, Inc., Bellmawr, N.J.

[21] Appl. No.: 300,018

[22] Filed: Jan. 23, 1989

[51] Int. Cl.⁵ ............................................. G02B 26/10
[52] U.S. Cl. ..................................... 350/6.6; 350/486; 318/129
[58] Field of Search ............... 350/6.1, 6.5, 6.6, 6.9, 350/6.91, 484, 486, 487; 318/116, 119, 129, 126, 135; 310/311, 321, 328

[56] References Cited

U.S. PATENT DOCUMENTS

| | | | |
|---|---|---|---|
| 3,902,048 | 8/1975 | Fleischer et al. | 235/61.11 E |
| 3,928,759 | 12/1975 | Sansone | 250/568 |
| 3,988,573 | 10/1976 | Hayosh et al. | 235/61.11 E |
| 3,995,166 | 11/1976 | Hobart et al. | 250/566 |
| 4,006,343 | 2/1977 | Izura et al. | 235/61.11 E |
| 4,093,865 | 6/1978 | Nickl | 250/566 |
| 4,097,729 | 6/1978 | Seligman et al. | 235/467 |
| 4,123,146 | 10/1978 | Dragt | 350/6.5 |
| 4,387,297 | 6/1983 | Swartz et al. | 235/462 |
| 4,389,101 | 6/1983 | van Rosmalen | 350/6.5 |
| 4,409,470 | 10/1983 | Shepard et al. | 235/472 |
| 4,460,120 | 7/1984 | Shepard et al. | 235/472 |
| 4,575,625 | 3/1986 | Knowles | 235/467 |
| 4,607,156 | 8/1986 | Koppenaal et al. | 235/472 |
| 4,713,532 | 12/1987 | Knowles | 235/467 |
| 4,760,248 | 7/1988 | Swartz et al. | 235/472 |
| 4,828,347 | 5/1989 | Keiser | 350/6.6 |

Primary Examiner—Bruce Y. Arnold
Assistant Examiner—Ronald M. Kachmarik
Attorney, Agent, or Firm—Caesar, Rivise Bernstein, Cohen Pokotilow, Ltd.

[57] ABSTRACT

Beam sweeping apparatus for use in a scanning device. The apparatus comprises a mirror mounted on a pivot arm and arranged to be oscillated about an axis in an arc for sweeping a beam of light in a predetermined path. A pair of resilient are located adjacent the pivot arm to establish the limits of the excursion of the arm and mirror. A reversible electromagnetic motor is provided when energized for causing the pivot arm to move in alternate rotational directions until a portion of it engages a respective one of the bumpers, whereupon that bumper prevents further excursion of the arm in that direction and bounces the arm back in the opposite rotational direction. The energization of the electromagnetic motor is coordinated with the engagement of the bumpers by the pivot arm.

37 Claims, 2 Drawing Sheets

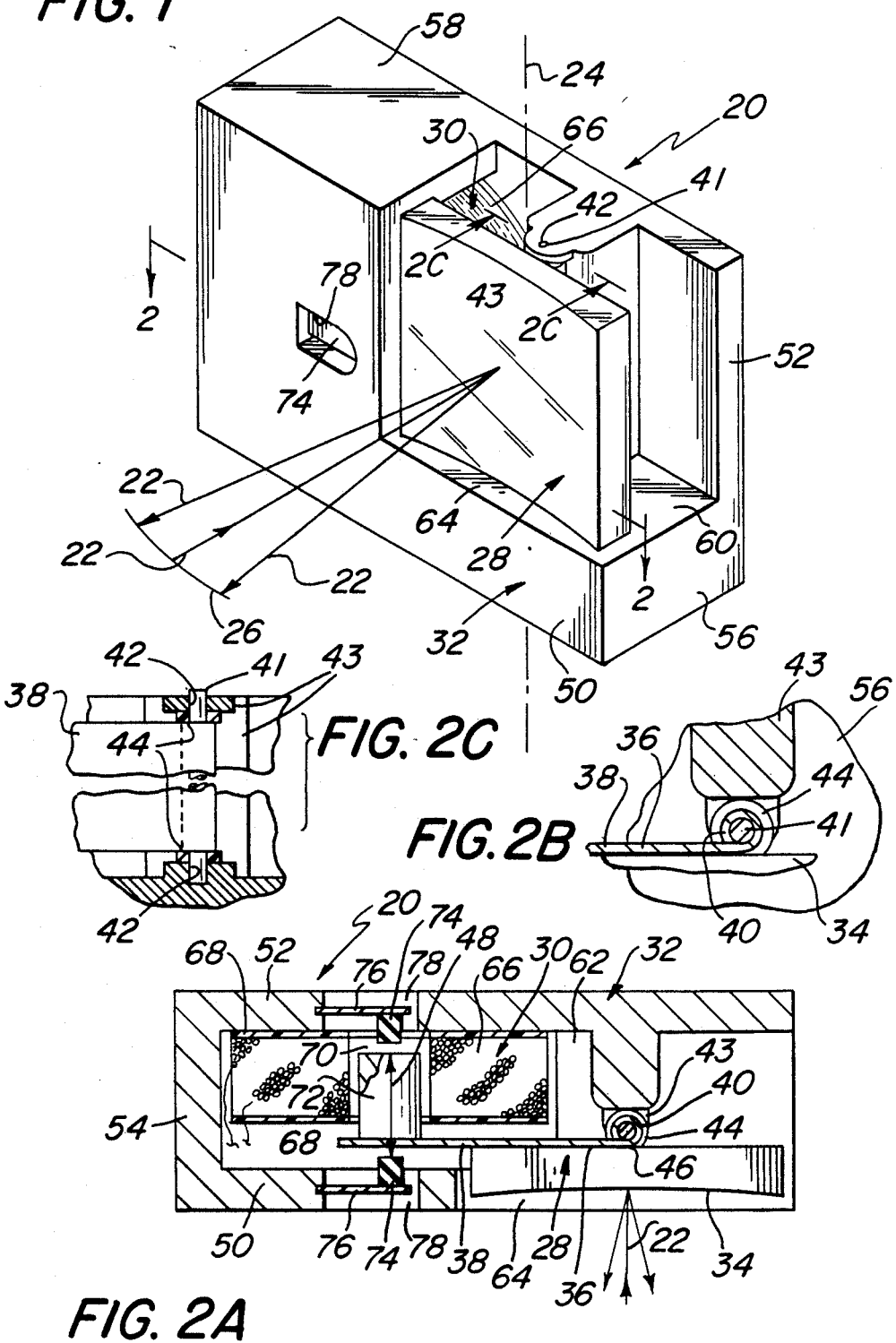

BOUNCING OSCILLATING SCANNING DEVICE FOR LASER SCANNING APPARATUS

BACKGROUND OF THE INVENTION

This invention relates to laser scanning systems and more particularly to devices for effecting the sweeping of a laser beam through a predetermined path.

Various laser-based scanning systems have been disclosed in the patent literature and many are commercially available to read bar codes, e.g., the uniform product code, which are imprinted on packaging for products, or on the products themselves.

One type of scanning system is referred to as a counter or "slot scanner". Another type of scanning system is referred to as a hand-held scanner. Slot scanners are generally mounted within a housing under a checkout counter at a supermarket or other retail establishment. The housing typically includes a window at the top through which a laser beam scanning pattern is projected. The scanning pattern typically consists of plural scan lines which are either parallel to one another and/or intersect one another.

The use of a multi-line scan pattern is dictated, at least in part, by the desire to be able to read the bar code omnidirectionally, i.e., read the bar code irrespective of the orientation of the symbol with respect to the scanner. One common way of producing multi-line scanning patterns in slot scanners is by directing a laser beam onto a rotating polygonal mirror. The rotation of each mirror face has the effect of sweeping the beam directed at it through a predetermined arc, thereby creating a linear scan pattern. The swept beam is then directed to various reflecting surfaces, e.g., mirrors, which are oriented at various angles and positions with respect to one another to convert the single line pattern into the multi-line pattern and to project that pattern out of the window into the space above the window. Hence a bar code held above the window and within the pattern can be read irrespective of the orientation of the bar code.

Examples of prior art slot scanners are found in the following U.S. Pat. Nos. 3,902,048 (Fleischer et al), 3,928,759 (Sansone), 3,988,573 (Hayosh), 3,995,166 (Hobart), 4,006,343 (Izura et al), 4,093,865 (Nickl), 4,097,729 (Seligman et al), and 4,713,532 (Knowles).

Hand-held scanners are devices which are small enough and light enough to be held in a user's hand to enable the aiming of a laser beam produced by the device at a bar code. Such scanners typically include a scanning head or housing containing all of the optical and electrical components to produce a laser beam, to project it out of a window in the head, to receive the light reflected off of the symbol, and to convert that reflected light into an electrical signal indicative of the symbol.

Inasmuch as hand held scanners must be small and light weight and since such devices are arranged to be aimed at the symbol to be read, such scanners commonly produce a pattern consisting only of a single line. This characteristic reduces the number and size of the optical and other components necessary to form the scan pattern.

Examples of various hand-held laser scanners have been disclosed in the following patent literature: U.S. Pat. Nos. 4,387,297 (Swartz et al.), 4,409,470 (Shepard et al.), 4,460,120 (Shepard et al.), 4,575,625 (Knowles), 4,607,156 (Koppenaal et al.) and 4,760,248 (Swartz et al.) and in my co-pending U.S. Pat. Application Ser. No. 07/128,299 filed on Dec. 3, 1987 entitled Ultra Compact, Hand-Held Laser Scanner which is assigned to the same assignee as this invention.

In my aforementioned co-pending U.S. Patent Application there is disclosed an extremely compact, ergonomically designed hand-held laser scanner than that of my aforementioned U.S. patent. The device of that application basically comprises a laser tube and associated high voltage power assembly (or in an alternative embodiment, a semi-conductor laser and associated current and power control means), beam folding and sweeping optics, e.g., an oscillating mirror and associated motor sub-assembly, a photo detector and associated amplification and signal processing circuit sub-assembly, a releasable input/output cable connector or plug, an associated input/output cable, and an on/off trigger assembly.

The use of an oscillating mirror and associated motor assembly offers reduced size and weight characteristics in comparison to a rotating polygon and associated motor for effecting beam sweeping action. However, the use of such a construction is not without drawback. For example, if the motor producing the oscillation is either a stepper motor or a galvanometer type motor (using either a taut band or needle bearings), as is commonly the case, energy of the magnetic field must be used to decelerate the scanning motion and then reverse it. Such action results in a sinusoidal variation of the beam position, and hence a sinusoidal variation of the beam speed across the beam path. As will be appreciated by those skilled in the art such variations in beam speed makes the process of discrimination between objects located a substantial distance, e.g., 10 inches or more, from the device relatively difficult. It is thus desirable to provide a motor which is small in size and weight and whose beam speed (i.e., the speed at which the beam is swept) is linear between reversals, with the duration of each reversal is kept to a minimum, e.g., a graph of the motor motion is saw toothed or triangular.

OBJECTS OF THE INVENTION

Accordingly, it is a general object of this invention to provide an oscillating scanning assembly which overcomes the disadvantages of the prior art.

It is a further object of this invention to provide an oscillating scanning assembly whose beam (scan) speed is substantially linear between direction reversals.

It is a further object of this invention to provide an oscillating scanning assembly whose beam (scan) speed is substantially linear between direction reversals and with the duration of said direction reversals being minimized.

It is a further object of this invention to provide an oscillating scanning assembly whose oscillating frequency is readily adjustable by the energization of the assembly.

It is a further object of this invention to provide an oscillating scanning assembly whose beam (scan) speed at any given distance from a symbol can be controlled by the energization of the assembly.

It is a further object of this invention to provide an oscillating scanning assembly which is simple in construction.

It is a further object of this invention to provide an oscillating scanning assembly which is compact in size.

It is a further object of this invention to provide an oscillating scanning assembly which is low in cost.

SUMMARY OF THE INVENTION

These and other objects of the invention are achieved by providing a beam sweeping apparatus for use in a scanning device. The apparatus comprises a movable member arranged to be oscillated about an axis in an arc for sweeping a beam of light in a predetermined path. The arc has a pair of end points. A pair of stop members are located adjacent the movable member to establish the limits of the excursion of the movable member and thereby define the end points of the arc. Reversible moving means are provided when energized for causing the movable member to move in one rotational direction until a portion of the movable member engages one of the stop members, whereupon the one stop member prevents further excursion of the movable member in the one rotational direction. The movable member then moves in the opposite rotational direction until a portion of it engages the other of the stop members, whereupon the other of the stop members prevents further excursion of the movable member in the other rotational direction. The moving means is then energized again to move the movable member in the one rotational direction.

In accordance with a preferred embodiment of this invention a reflective member is carried by the movable member and the moving means is energized in coordination with the movable member engaging the one stop member and is also energized in coordination with the movable member engaging the other stop member, whereupon the reflective member is oscillated.

DESCRIPTION OF THE DRAWING

Other objects and many attendant features of this invention will become readily appreciated as the same becomes better understood by reference to the following detailed description when considered in connection with the accompanying drawings wherein:

FIG. 1 is a perspective view of one embodiment of the device of the subject invention;

FIG. 2A is a sectional view taken along line 2—2 of FIG. 1;

FIG. 2B is a top elevational view of a portion of the device shown in FIG. 1;

FIG. 2C is a front elevational view of a portion of the device shown in FIG. 1;

DETAILED DESCRIPTION OF THE PREFERRED EMBODIMENT

Figure 3:
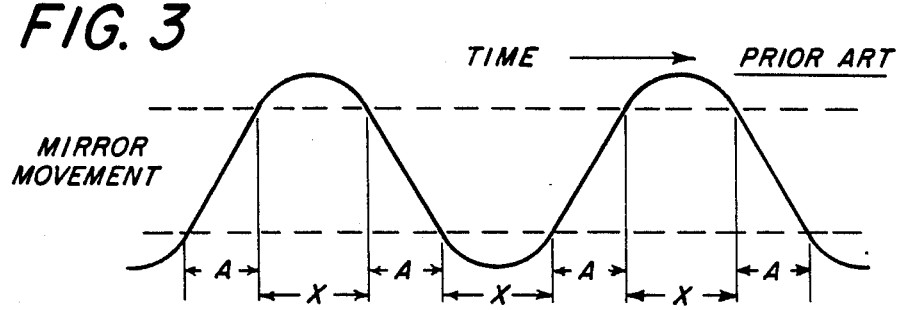
FIG. 3 is a graph of the sinusoidal oscillation of a prior art stepper motor or galvanometer based motor.

Referring now to various figures of the drawing where like reference numerals refer to like parts there is shown at 20 in FIG. 1 one embodiment of a device constructed in accordance with this invention. The device 20 is arranged to be incorporated in any type of laser scanning apparatus or system (not shown) to receive a beam 22 of laser light from means, e.g., a laser diode or laser tube (not shown) therein, to reflect and sweep the beam through a predetermined arc, e.g., +/−7 degrees, about an axis 24. The resulting line pattern 26 can then be directed off of other reflective means (not shown) or directly out of the window (not shown) of the scanning apparatus or system to scan a bar code disposed opposite the window.

It must be pointed out at this juncture that the use of the subject invention need not be limited to laser scanning systems. Thus, the device can be used in any type of system wherein it is desired to oscillate electromagnetic radiation, such as, but not limited to light, through a predetermined arc.

As can be seen clearly in FIGS. 1 and 2 the device basically comprises light reflective means 28, oscillatory motor means 30, and mounting means 32. The reflective means 28, in the preferred embodiment disclosed herein, comprises a concave mirror 34, but can be any other suitable shape, e.g., planar. In fact, the reflective means need not be a mirror, but can be any suitable means, e.g., a prism, etc., as long as it is capable of diverting incident light thereof. The mirror 34 is mounted on a pivot arm 36. That arm is in turn mounted on the mounting means 32 at the location of the pivot axis 24. Thus, as can be seen clearly in FIGS. 2A and 2B the pivot arm 36 comprises an elongated section 38 on which the mirror 34 is fixedly secured and a looped end 40. A pivot pin 41 extends through the looped end 40 and is mounted in aligned holes 42 in a pair of brackets 43 in the mounting means 32. The holes 42 are coincident with the pivot axis 24. As can be seen clearly in FIGS. 2B and 2C a pair of low friction, e.g., Teflon, sleeves 44 are disposed at opposite ends on the pivot pin 41 interposed between the sides of the pivot arm's looped end 40 and the respective brackets 42. The pivot pin 41, being located coincident with the axis 24, serves the pivot point for the mirror 34. The free end of pivot arm section 38 is coupled to means, to be described later, forming a portion of the motor means 30, to pivot the arm through an arc 48 about axis 24 so that the mirror is oscillated about that axis. The arm 36 serves primarily as a rugged, yet low cost, pivot for the mirror and not as a position restoring device. Restoration of the mirror's position at each end of its oscillatory excursion is effected by other means (to be described later).

The mounting means 32, in addition to providing the pivotable support for the mirror, also houses the motor means 30, and enables the entire device to be readily mounted within the laser scanning apparatus or system. Thus, the mounting means comprises a block-like housing having a front wall 50, a rear wall 52, a side wall 54, a side wall 56, a top wall 58, and a bottom wall 60, all of which define an interior cavity or space 62. The motor means 30 is disposed within that space. The pivot arm supporting brackets 42 project from the rear wall 52 into the cavity 62.

The front wall 32, side wall 56, and top wall 58 of the housing are cut away contiguous with the space 62 to form a rectangular recess 64 in which the mirror 34 is located. The housing may be formed of any suitable material, e.g., aluminum.

As can be seen in FIG. 2 the motor means 30 basically comprises an coil 66 of electrically conductive wire to form an electromagnet. The coil is disposed between a pair of electrically insulative end plates 68. The coil's leads are arranged to be connected to means (not shown) for providing electrical energy of the type to be described later to the coil to energize it. The coil includes a hollow center or bore 70 and is mounted, e.g., glued, on the rear wall 52 of the housing via one of its end plates 68, so that the bore 70 is located immediately adjacent the free end of the pivot arm section 38. Each coil end plate includes a central hole contiguous with the coil's bore. The motor also includes a cylindrical permanent magnet 72 which is fixedly mounted on the free end of the pivot arm section 38 and is disposed centered within the bore 70.

The energization of the coil 66, which will be described in detail later, causes the magnet to be pulled and pushed into and out of the bore 70, thereby causing the arm to oscillate as described heretofore. The amount of excursion of the magnet into and out of the bore 70, and hence the angle of the mirror's oscillation about axis 24, is established by the use of a pair of adjustable stops. Each stop comprises a resilient material, i.e., silicone rubber, bumper 74. The bumpers are mounted adjacent opposite ends of the bore 70. Thus, one bumper is mounted immediately adjacent the free end of the pivot arm section 38, while the other bumper is mounted immediately adjacent the free end (top) of the magnet 72.

The spacing between the opposed bumpers establishes the amount of excursion of the magnet, and, as mentioned earlier, is adjustable. Thus, each bumper is mounted on the free end of an elongated tab 76. Each tab 76 is, in turn, mounted within a respective opening 78 in the housing. In particular, one tab 76 is mounted within an opening 78 in the housing's front wall 50, while the other tab is mounted within a similar opening in the rear wall 52. The tabs are each formed of a permanently bendable material, e.g., steel or aluminum, so that they can be bent adjacent their junction with the opening in which they are located to move the bumpers closer together or further apart, as is desired, and to stay in that position until rebent to readjust the bumper spacing.

It must be pointed out at this juncture that other adjustable mounting means for the bumpers 74 can be used in lieu of the tabs 76. Thus, each bumper may be mounted on an adjustable set screw, or other positionable member, to establish the spacing between the bumpers.

Figure 4:
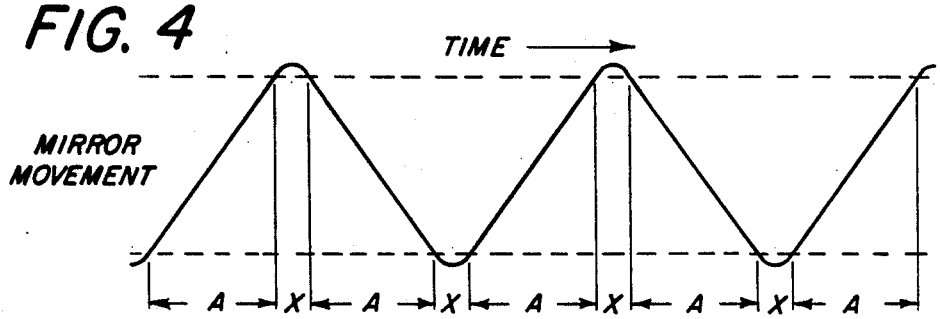
FIG. 4 is a graph of the oscillation of the device shown in FIG. 1.
Figure 5:
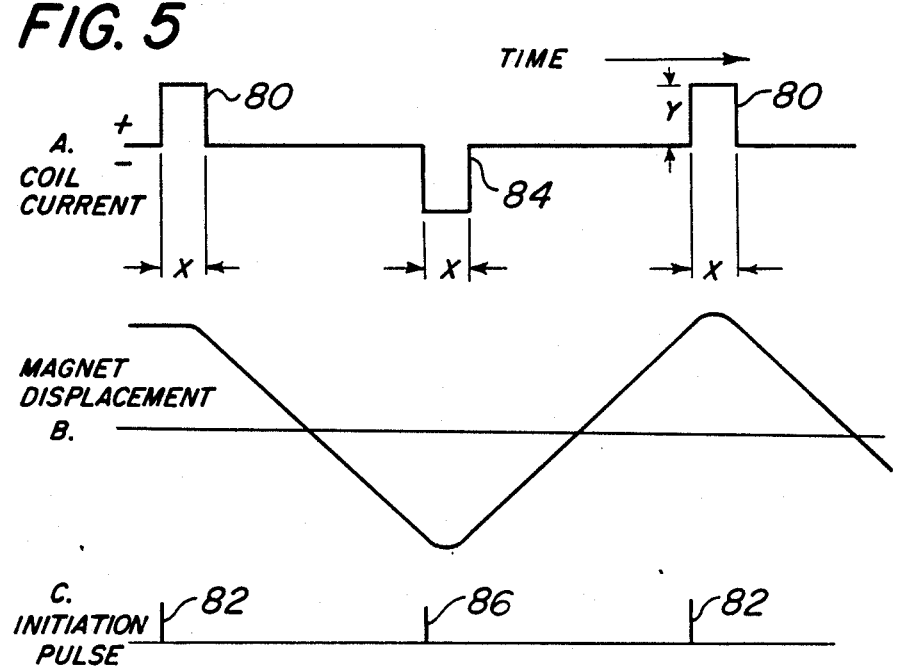
FIG. 5A is a graph of the current through the coil of the device shown in FIG. 1.
FIG. 5B is a graph of the magnet displacement of the device shown in FIG. 1.
FIG. 5C is a graph of the pulses to initiate reverse current through the coil of the device shown in FIG. 1.

Referring now to FIGS. 4 and 5A-5C the details of the operation of the motor means 30 will now be described. In accordance with this invention the coil is selectively energized to produce an alternating magnetic field in the bore 72. In particular, as can be seen in FIG. 5A, a series of pulses 80 of electrical current of one polarity, e.g., positive, are produced by current supply means (not shown) and passed through the coil 66 in response to the occurrence of a series of respective very short duration initiation pulses 82 (FIG. 5C), while a series of current pulses 84 of opposite polarity, e.g., negative, are alternatively passed through the coil in response to the occurrence of a series of respective very short duration, initiation pulses 86. The initiation pulses 82 and 86 are produced by any suitable control means (not shown) each time the pivot arm 36 has reached the end of its particular excursion, i.e., when the free end of the arm or the free end of the magnet (as the case may be) has engaged a bumper 74. Sensor means (not shown) are provided at each bumper and are coupled to the control means to initiate the production of the initiation pulses 82 and 86.

The alternate energization of the coil 66 coupled with the operation of the elastic bumpers (e.g., the bumpers stop the excursion of the arm in one direction and due to their resiliency impart a force to the arm in the opposite direction) results in the displacement of the magnet 72 as shown in FIG. 5B. In particular, during the duration of each current pulse 80 or 84 the direction of magnet displacement is reversed in part by the action of the bumpers and in part by the reverse current. Thus, as can be seen the magnet movement is linear between direction reversals, while the duration of each such reversal is only a very small portion of the period of oscillation. Since the mirror is mounted on the pivot arm the mirror movement or displacement when plotted versus time is of a sawtooth shape as shown in FIG. 4, rather than the sinusoidal shape (FIG. 3) as has characterized the prior art described earlier.

As should be appreciated by those skilled in the art by controlling or adjusting the pulsewidth (X) and/or magnitude (Y) of the current pulses 80 and 84 one can control or adjust the velocity of the movement of the magnet 72 (and hence mirror 34).

It should be pointed out at this juncture that the device of this invention need not utilize electromagnetic actuation to effect the oscillatory motion. Thus, for example piezoelectric means can be utilized. Moreover, one need not utilize bidirectional energization of the device to effect each excursion of the oscillation. Thus, it is contemplated that the device can be pulsed or energized in only one direction to move the mirror (or other reflective surface) in that one direction until the bumper is engaged, whereupon the device is bounced back in the opposite direction until it reaches the other bumper, at which time the device is again energized to move it in the one direction, and so forth and so on.

As will also be appreciated by those skilled in the art the scanning unit 20 of this invention offers substantial advantages over the sinusoidal or near sinusoidal oscillation that is achieved with a stepper motor, a galvanometer type motor, or a taut band mounted oscillating mirror. In this connection the oscillation is much more linear, with the duration of direction reversals being minimized. This action provides a more linear speed for the scanning beam, thus making the decoding of the bar code easier to accomplish.

Moreover, the linear portion of the scan is a greater percentage of the total scan duration, while the dead time (direction reversal) time is a lower percentage thereof. That characteristic enables one to effect more scans per second at a given decoding speed.

Furthermore, the subject invention uses less power, inasmuch as the bulk of the return force is provided by the elastic stop members (bumpers) at the end of each directional excursion, rather than by the utilization of electrical power to decelerate the mirror to effect direction reversal as has characterized the prior art.

Further still, control or adjustment of the scan speed and/or scan rate can be effected by control or adjustment of the magnitude and/or duration of the energy pulses provided to the device, e.g., a heavier pulse will increase the speed of reversal, while a lighter pulse will decrease that speed. The ability to control or adjust scan velocity by the ready adjustment of the energy provided to the device enables the precise setting of the frequency and speed at the factory, and if desired enabling the user to field service the device to the desired setting in the event of a change. Moreover, the ability to adjust scan velocity enables the optimization of the scanner for objects to be located at varying distances from the scanner, an obviously significant feature for hand-held scanners. For example, the use of the scan speed control as provided by this invention enables one to provide a scanner which either senses the size of the bars and spaces of the symbol being read or the distance from the scanner to the symbol by means in the scanner to adjust or compensate for the distance variations rather than using the decoding microprocessor for that purpose. Alternatively, one can sense the distance by some means, e.g., sonic detection or optical correlation means, then adjust the scan speed for optimum optical bar code decoding. This adjustment enables one to utilize existing low cost 8-bit microprocessors rather than the more expensive 16-bit microprocessors for effecting decoding.

Without further elaboration the foregoing will so fully illustrate my invention that others may, by applying current or future knowledge, readily adapt the same for use under various conditions of service.

I claim:

1. A beam sweeping apparatus for use in a scanning device, said apparatus comprising a movable member arranged to be oscillated about an axis in an arc for sweeping a beam of light in a predetermined path, said arc having a pair of end points, a pair of stop members located adjacent said movable member to establish the limits of the excursion of said movable member and thereby define said end points of said arc, and reversible moving means comprising energizable means operative to be periodically energized by discrete pulses of electrical energy, one of said discrete pulses causing said movable member to move in one rotational direction until a portion of said movable member engages one of said stop members, whereupon said one stop member prevents further excursion of said movable member in said one rotational direction, said movable member then moving in the opposite rotational direction until a portion of said movable member engages the other of said stop members, whereupon said other of said stop members prevents further excursion of said movable member in said other rotational direction, said moving means then being energized by another of said discrete pulses of electrical energy to again move said movable member in said one rotational direction.

2. The apparatus of claim 1 wherein said stop members each comprise a resilient bumper.

3. The apparatus of claim 1 wherein said moving means is energized in coordination with said movable member engaging said other stop member, whereupon said movable member is moved in said one rotational direction.

4. The apparatus of claim 3 wherein said moving means is also energized in coordination with said movable member moved in said opposite rotational direction.

5. The apparatus of claim 4 wherein the speed of said movable member is substantially linear between said end points of said arc.

6. The apparatus of claim 4 wherein the time period during which said movable member reverses direction at said end points is very short as compared to the time period said movable member moves between said end points.

7. The apparatus of claim 6 wherein the speed of said movable member is substantially linear between said end points of said arc.

8. The apparatus of claim 4 wherein said reversible moving means comprises electrical coil means coupled to said movable member and arranged to be alternately energized by oppositely polarized discrete current pulses to produce an alternating electric field to effect the oscillating movement of said movable member about said axis.

9. The apparatus of claim 8 wherein the polarity of said current is reversed in a very short period of time coordinated with the engagement of said movable member by said stop means, whereupon the time period during which said movable member reverses direction at said end points is very short as compared to the time period said movable member moves between said end points.

10. The apparatus of claim 9 wherein the speed of said movable member is substantially linear between said end points of said arc.

11. The apparatus of claim 8 additionally comprising magnet means connected to said movable means and located within said field.

12. The apparatus of claim 11 wherein said magnet means comprises a permanent magnet.

13. The apparatus of claim 11 wherein said stop members each comprise a resilient bumper.

14. The apparatus of claim 13 wherein each of said stop members is adjustably mounted with respect to said movable member to adjust the position of the end points of said arc.

15. The apparatus of claim 8 wherein said current pulses are provided to said coil at the time that said movable member is engaged by said stop member.

16. The apparatus of claim 15 wherein the amplitude of said pulses is adjustable to regulate the beam sweeping speed of said movable member.

17. The apparatus of claim 15 wherein the width of said pulses is adjustable to regulate the beam sweeping speed of said movable member.

18. The apparatus of claim 15 additionally comprising sensor means coupled to said stop means for effecting the reversal of the polarity of said current when said movable member is engaged by said stop member.

19. The apparatus of claim 8 wherein the amplitude of said pulses is adjustable to regulate the beam sweeping speed of said movable member.

20. The apparatus of claim 8 wherein the width of said pulses is adjustable to regulate the beam sweeping speed of said movable member.

21. The apparatus of claim 8 wherein said apparatus additionally comprises reflective means coupled to said movable means for receiving a beam of light from a light source and for reflecting said beam therefrom as said reflective means is oscillated about said axis, to thereby sweep said beam of light in said path.

22. The apparatus of claim 4 wherein said apparatus additionally comprises reflective means coupled to said movable means for receiving a beam of light from a light source and for reflecting said beam therefrom as said reflective means is oscillated about said axis, to thereby sweep said beam of light in said path.

23. The apparatus of claim 3 wherein the speed of said movable member is substantially linear between said end points of said arc.

24. The apparatus of claim 3 wherein the time period during which said movable member reverses direction at said end points is very short as compared to the time period said movable member moves between said end points.

25. The apparatus of claim 24 wherein the speed of said movable member is substantially linear between said end points of said arc.

26. The apparatus of claim 3 wherein said reversible moving means comprises electrical coil means coupled to said movable member and arranged to be selectively energized by said discrete pulses of electrical energy.

27. The apparatus of claim 3 wherein said apparatus additionally comprises reflective means coupled to said movable means for receiving a beam of light from a light source and for reflecting said beam therefrom as said reflective means is oscillated about said axis, to thereby sweep said beam of light in said path.

28. The apparatus of claim 1 wherein the time period during which said movable member reverses direction at said end points is very short as compared to the time period said movable member moves between said end points.

29. The apparatus of claim 1 wherein said reversible moving means comprises electrical coil means coupled to said movable member and arranged to be selectively energized by said discrete pulses of electrical energy.

30. The apparatus of claim 1 wherein said apparatus additionally comprises reflective means coupled to said movable means for receiving a beam of light from a light source and for reflecting said beam therefrom as said reflective means is oscillated about said axis, to thereby sweep said beam of light in said path.

31. A beam sweeping apparatus for use in a scanning device, said apparatus comprising a movable member arranged to be oscillated about an axis in an arc for sweeping a beam of light in a predetermined path, said arc having a pair of end points, a pair of stop members located adjacent said movable member to establish the limits of the excursion of said movable member and thereby define said end points of said arc, each of said stop members being adjustably mounted with respect to said movable member to adjust the position of the end points of said arc, and reversible moving means operative when energized for causing said movable member to move in one rotational direction until a portion of said movable member engages one of said stop members, whereupon said one stop member prevents further excursion of said movable member in said one rotational direction, said movable member then moving in the opposite rotational direction until a portion of said movable member engages the other of said stop members, whereupon said other of said stop members prevents further excursion of said movable member in said other rotational direction, said moving means then being energized to again move said movable member in said one rotational direction.

32. A beam sweeping apparatus for use in a scanning device, said apparatus comprising a movable member arranged to be oscillated about an axis in an arc for sweeping a beam of light in a predetermined path, said arc having a pair of end points, a pair of stop members located adjacent said movable member to establish the limits of the excursion of said movable member and thereby define said end points of said arc, each of said stop members being adjustably mounted with respect to said movable member to adjust the position of the end points of said arc, and reversible moving means operative when energized for causing said movable member to move in one rotational direction until a portion of said movable member engages one of said stop members, whereupon said one stop member prevents further excursion of said movable member in said one rotational direction, said movable member then moving in the opposite rotational direction until a portion of said movable member engages the other of said stop members, whereupon said other of said stop members prevents further excursion of said movable member in said other rotational direction, said moving means then being energized to again move said movable member in said one rotational direction, said moving means being energized in coordination with said movable member engaging said other stop member, whereupon said movable member is moved in said one rotational direction.

33. The apparatus of claim 32 wherein said stop members each comprise a resilient bumper.

34. A beam sweeping apparatus for use in a scanning device, said apparatus comprising a movable member arranged to be oscillated about an axis in an arc for sweeping a beam of light in a predetermined path, said arc having a pair of end points, a pair of stop members located adjacent said movable member to establish the limits of the excursion of said movable member and thereby define said end points of said arc, each of said stop members being adjustably mounted with respect to said movable member to adjust the position of the end points of said arc, and reversible moving means operative when energized for causing said movable member to move in one rotational direction until a portion of said movable member engages one of said stop members, whereupon said one stop member prevents further excursion of said movable member in said one rotational direction, said movable member then moving in the opposite rotational direction until a portion of said movable member engages the other of said stop members, whereupon said other of said stop members prevents further excursion of said movable member in said other rotational direction, said moving means then being energized to again move said movable member in said one rotational direction, said moving means being energized in coordination with said movable member engaging said other stop member, whereupon said movable member is moved in said one rotational direction, said moving means also being energized in coordination with said movable member engaging said one stop member, whereupon said movable member is moved in said opposite rotational direction.

35. The apparatus of claim 34 wherein said stop members each comprise a resilient bumper.

36. A beam sweeping apparatus for use in a scanning device, said apparatus comprising a movable member arranged to be oscillated about an axis in an arc for sweeping a beam of light in a predetermined path, said arc having a pair of end points, a pair of stop members located adjacent said movable member to establish the limits of the excursion of said movable member and thereby define said end points of said arc, and reversible moving means operative when energized for causing said movable member to move in one rotational direction until a portion of said movable member engages one of said stop members, whereupon said one stop member prevents further excursion of said movable member in said one rotational direction, said movable member then moving in the opposite rotational direction until a portion of said movable member engages the other of said stop members, whereupon said other of said stop members prevents further excursion of said movable member in said other rotational direction, said moving means then being energized to again move said movable member in said one rotational direction, the speed of said movable member being substantially linear between said end points of said arc.

37. A beam sweeping apparatus for use in a scanning device, said apparatus comprising a movable member arranged to be oscillated about an axis in an arc for sweeping a beam of light in a predetermined path, said arc having a pair of end points, a pair of stop members located adjacent said movable member to establish the limits of the excursion of said movable member and thereby define said end points of said arc, and reversible moving means operative when energized for causing said movable member to move in one rotational direction until a portion of said movable member engages one of said stop members, whereupon said one stop member prevents further excursion of said movable member in said one rotational direction, said movable member then moving in the opposite rotational direction until a portion of said movable member engages the other of said stop members, whereupon said other of said stop members prevents further excursion of said movable member in said other rotational direction, said moving means then being energized to again move said movable member in said one rotational direction, the time period during which said movable member reverses direction at said end points being very short as compared to the time period said movable member moves between said end points and the speed of said movable member being substantially linear between said end points of said arc.

* * * * *